(12) United States Patent
Jacobson et al.

(10) Patent No.: US 8,847,149 B2
(45) Date of Patent: Sep. 30, 2014

(54) DETERMINING FORMATION CHARACTERISTICS

(75) Inventors: Larry Alan Jacobson, Richmond, TX (US); Gordon L. Moake, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 375 days.

(21) Appl. No.: 12/529,244

(22) PCT Filed: Aug. 14, 2007

(86) PCT No.: PCT/US2007/017993
§ 371 (c)(1),
(2), (4) Date: Apr. 14, 2010

(87) PCT Pub. No.: WO2009/023009
PCT Pub. Date: Feb. 19, 2009

(65) Prior Publication Data
US 2010/0193676 A1    Aug. 5, 2010

(51) Int. Cl.
*G01V 5/10*    (2006.01)
(52) U.S. Cl.
CPC .............. *G01V 5/102* (2013.01); *G01V 5/101* (2013.01)
USPC ..................................................... 250/269.8
(58) Field of Classification Search
CPC ...................................................... G01V 5/102
USPC ..................................................... 250/269.8
See application file for complete search history.

(56) References Cited

U.S. PATENT DOCUMENTS

| | | | |
|---|---|---|---|
| 4,350,887 A | 9/1982 | Barnard et al. | |
| 4,350,888 A * | 9/1982 | Peelman | 250/269.8 |
| 4,424,444 A | 1/1984 | Smith, Jr. et al. | |
| 4,645,926 A | 2/1987 | Randall | |
| 5,469,736 A * | 11/1995 | Moake | 73/152.58 |
| 5,486,695 A * | 1/1996 | Schultz et al. | 250/261 |
| 5,825,024 A | 10/1998 | Badruzzaman | |
| 5,900,627 A | 5/1999 | Odom et al. | |
| 6,150,655 A * | 11/2000 | Odom et al. | 250/269.6 |
| 6,376,838 B1 * | 4/2002 | Odom | 250/269.6 |

(Continued)

FOREIGN PATENT DOCUMENTS

| | | |
|---|---|---|
| WO | WO-01/22123 A1 | 3/2001 |
| WO | WO-2009023009 A1 | 2/2009 |
| WO | WO-2009023009 A8 | 2/2009 |

OTHER PUBLICATIONS

"European Application Serial No. 07836812.3, Extended Search Report mailed Aug. 22, 2012", 7 pgs.

(Continued)

*Primary Examiner* — Constantine Hannaher
(74) *Attorney, Agent, or Firm* — Schwegman Lundberg & Woessner, P.A.; Anthony Iannitelli

(57) ABSTRACT

In some embodiments, apparatus and systems, as well as methods, may operate to irradiate a portion of a geological formation with neutrons in a neutron burst generated by a switchable electronic source, to measure (with one or more detectors) a flux of gamma rays to provide a measured flux, at least a portion of the gamma rays being generated by the neutrons, and to determine one or more of a neutron porosity, a density, and/or a photoelectric factor of the geological formation based on the measured flux. Other apparatus, systems, and methods are disclosed.

33 Claims, 7 Drawing Sheets

(56) References Cited

U.S. PATENT DOCUMENTS

| | | | |
|---|---|---|---|
| 6,665,616 B2 * | 12/2003 | Mickael | 702/8 |
| 7,117,092 B2 | 10/2006 | Jacobson | |
| 7,166,834 B2 * | 1/2007 | Gilchrist et al. | 250/269.1 |
| 8,476,584 B2 * | 7/2013 | Li et al. | 250/269.8 |
| 8,660,796 B2 * | 2/2014 | Jacobson et al. | 702/8 |
| 2005/0028586 A1 | 2/2005 | Smits et al. | |
| 2006/0033023 A1 | 2/2006 | Pemper et al. | |
| 2006/0243898 A1 | 11/2006 | Gilchrist | |
| 2014/0005945 A1 * | 1/2014 | Anand et al. | 702/8 |

OTHER PUBLICATIONS

"Application Serial No. PCT/US2007/17993, International Preliminary Examination Report mailed Mar. 30, 2010", 7 pgs.

"Application Serial No. PCT/US2007/17993, International Search Report mailed Apr. 23, 2008", 3 pgs.

"Application Serial No. PCT/US2007/17993, Written Opinion mailed Apr. 23, 2008", 7 pgs.

"European Application Serial No. 07836812.3, Office Action mailed Jun. 4, 2013", 8 pgs.

"European Application Serial No. 07836812.3, Response filed Mar. 8, 2013 to Extended European Search Report mailed Aug. 22, 2012", 13 pgs.

"European Application Serial No. 07836812.3, Summons to Attend Oral Proceedings mailed Dec. 17, 2013", 5 pgs.

Schultz, W. E., et al., "Experimental Basis for a New Borehole Corrected Pulsed Neutron Capture Logging System (TMD)", *SPWLA Twenty-Fourth Annual Logging Symposium*, Jun. 27-30, 1983, (1983), 1-16.

"European Application Serial No. 07836812.3, Response filed Oct. 7, 2013 to Office Action mailed Jun. 4, 2013", 14 pgs.

European Application Serial No. 07836812.3, Decision to Refuse mailed Apr. 10, 2014, 14 pgs.

European Application Serial No. 07836312.3, Response filed Feb. 25, 2014 to Summons mailed Dec. 17, 2013, 41 pgs.

European Application Serial No. 07836812.3, Result of Consultation mailed Mar. 20, 2014. 6 pgs.

Ellis, Darwin V., et al., "Pulsed Neutron Devices", *Well Logging for Earth Scientists*, (Jan. 1, 1987), 281-304.

\* cited by examiner

US 8,847,149 B2

DETERMINING FORMATION CHARACTERISTICS

This patent application is a U.S. National Stage Filing under 35 U.S.C. 371 from International Patent Application Serial No. PCT/US2007/017993 filed Aug. 14, 2007, entitled DETERMINING FORMATION CHARACTERISTICS which application is incorporated herein by reference in its entirety.

TECHNICAL FIELD

Various embodiments described herein relate to determining characteristics of geological formations, including density and porosity.

BACKGROUND INFORMATION

Fluids (e.g., oil, water, gas) may exist in a variety of materials, including geological formations. These fluids are often recovered using a well, or a borehole cut into the formation. During exploration and recovery operations, it is therefore useful to determine the characteristics of the formation in which the fluids reside.

Gamma ray measurements can be used to determine certain formation characteristics, such as the formation density, neutron porosity, and photoelectric factor. Knowledge of these characteristics can help geologists decide what type of rock makes up the formation (e.g., limestone, sandstone). To make such determinations, a source of neutrons that propagate into and react with the formation to produce gamma rays can be used. While readily available, chemical (e.g., radio-isotope) sources of neutrons present a potential safety hazard and have associated logistical complications.

Besides finding a source that is safe and effective, other difficulties exist when attempting to determine formation characteristics. For example, some methods depend on accurate knowledge of the neutron generator output and/or calibration to open-hole log data. Other methods that operate to remove sensitivity to absolute neutron output do not take into account both neutron and gamma transport effects when measuring gamma flux at the detector. Still other methods fail to make provision for many variables that affect measurements, including standoff and variations in mud properties.

DETAILED DESCRIPTION

In some embodiments of the invention, the challenges described above may be addressed by using a non-chemical (e.g., a neutron accelerator) source as the basis for determining various formation characteristics. If the effects of neutron and gamma transport are taken into account, and measurements sensitive to a number of selected unknowns are made, many formation characteristics (e.g., density and porosity) can be determined independently of the neutron generation rate with better accuracy than is currently available with non-chemical sources.

When employing pulsed neutron techniques for measuring formation density, it should be noted that detected gamma flux is the product of two nuclear processes: neutron and gamma transport. Neutron transport involves inelastic and elastic scattering which slows neutrons down until such time as the neutrons are finally absorbed by some element and disappear. Neutron transport is affected by the hydrogen content of the rock (i.e., the porosity), the rock type, and rock density as well as other properties. Inelastic scattering and the final neutron absorption event produce gamma rays with a wide energy range. Some of these gamma rays propagate toward gamma ray detectors, where transport is governed by the gamma scattering properties of the formation (i.e., the bulk density and effective atomic number).

Figure 1:
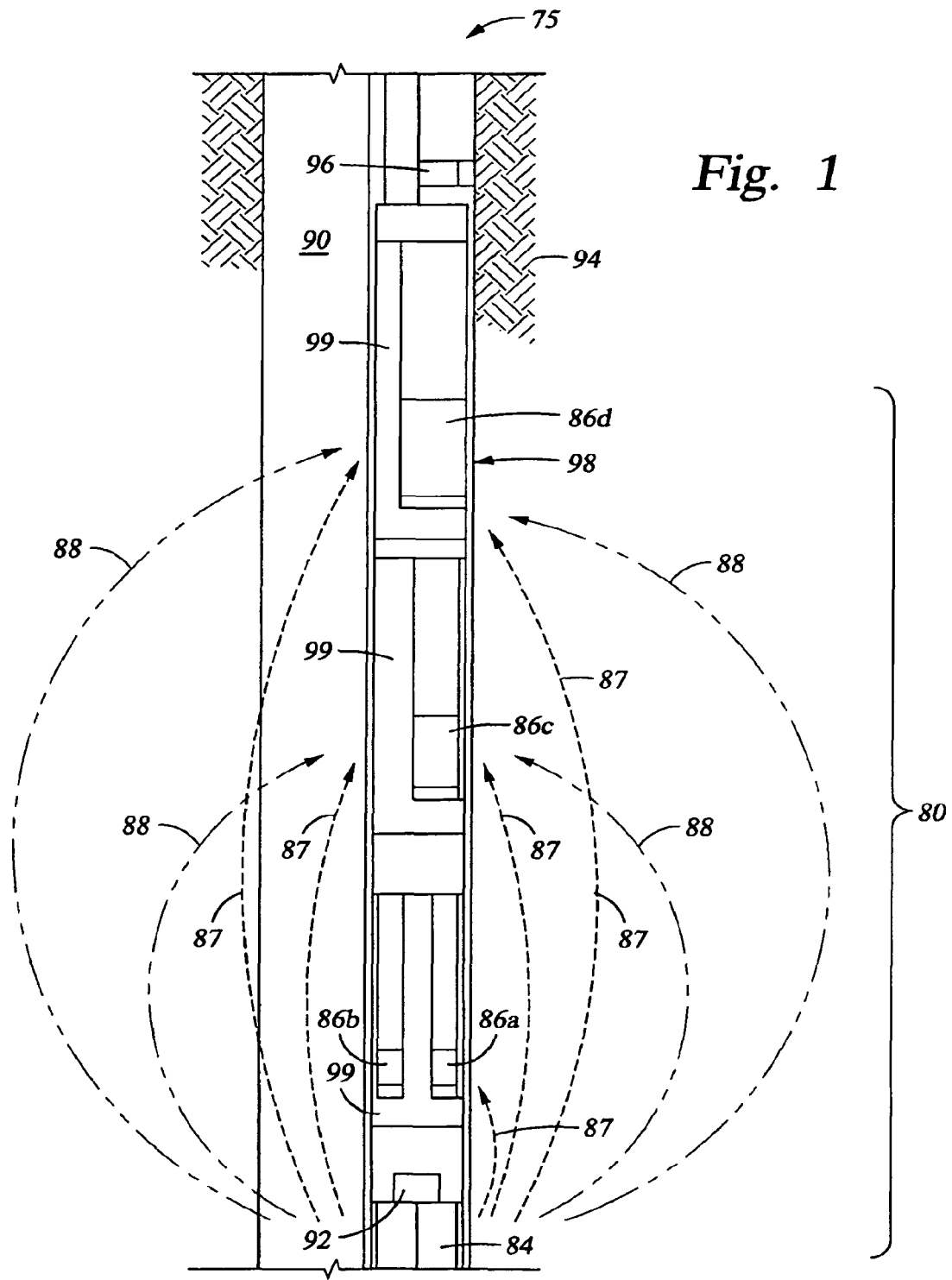
FIG. 1 is a side, cut-away view of an open-hole logging tool with a pulsed-neutron density detector package according to various embodiments of the invention.

FIG. 1 is a side, cut-away view of an open-hole logging tool 75 with a pulsed-neutron density detector package 80 according to various embodiments of the invention. The source 84 may comprise a neutron generator, such as a pulsed neutron generator, and the package 80 may comprise a plurality of gamma ray detectors 86. Neutrons from the source 84 travel through the borehole 90 and formation 94, generating gamma rays 87, 88 in the process.

Some of the gamma rays scatter 87 (i.e., gamma rays generated from inelastic neutron scattering) back into the detectors 86 in the tool 75. Some of the gamma rays 88 are generated from captured neutrons.

The number of gamma rays 87, 88 that reach the detectors 86 depends on many factors, one of which is the density of the formation 94. Gamma-ray detectors 86 measure the energy of each gamma ray 87, 88 and the time at which it is detected. Standoff and caliper measurements can also be made, as a part of, or separately from, the tool 75 function. The resulting information is used to determine the density of the formation 94. The porosity and photoelectric factor (Pe) for the formation 94 may also be determined.

The neutron generator 84, which is well-known to those of ordinary skill in the art, may comprise a relatively long, thin tube in which deuterium and tritium ions (isotopes of hydrogen) are accelerated in an electric field and focused so as to collide with a target that also contains deuterium and tritium. When deuterium and tritium atoms collide, they produce neutrons with an energy of about 14.1 MeV.

Neutrons created by the generator 84 propagate in all directions and interact with the matter they encounter. This produces gamma rays 87, 88 through two different mechanisms. In elastic scattering, a neutron scatters off of a nucleus without changing the structure of the nucleons in the nucleus. No gamma rays are produced, but the neutron loses energy. In inelastic scattering, a neutron scatters off a nucleus and perturbs the structure of the nucleus, leaving it in a higher-energy configuration. However, the nucleus cannot stay in that configuration long, and when it reverts to its original state, one or more gamma rays, called inelastic gamma rays 87, are emitted. This interaction significantly reduces the energy of the neutron. The neutron eventually reaches an energy where it is in equilibrium with the surrounding temperature as a result of these elastic and inelastic interactions. At this energy it will bounce around the environment until captured by a nucleus in a process called neutron capture, converting the nucleus to a new isotope. In general, this reaction does not leave the new isotope in its lowest-energy configuration. Thereafter, the new isotope will eventually decay into its lowest-energy configuration, also emitting gamma rays 88 in the process. These gamma rays are called capture gamma rays 88.

Inelastic scattering occurs when neutrons have a relatively high energy, so these reactions occur within a few microseconds of when the neutron is generated, before it has lost too much energy. As a matter of contrast, neutron capture occurs when the neutrons are at a very low energy, perhaps as much as 1000 microseconds after the neutron was generated. Since gamma rays 87, 88 generated by these reactions contain different information about the surrounding environment, it is useful to differentiate between the two types of gamma rays. Towards this end, the generator 84 is typically operated as a pulsed generator by turning it on and off in a cyclical fashion. Thus, it is typically on for a short period, called the neutron burst, and off for hundreds or thousands of microseconds.

Gamma ray detectors 86 may comprise scintillating crystals attached to photomultipliers. Gamma rays 87, 88 scatter off of electrons in the crystals, which in turn generate light. Some of the light reaches the photomultiplier, which converts it into an electronic signal. Proper manipulation of this signal, in a manner well-known to those of ordinary skill in the art, provides an electronic pulse whose amplitude is proportional to the energy deposited in the crystal. Various types of crystals can be used, including but not limited to sodium iodide, bismuth germanate, cesium iodide, gadolinium orthosilicate, and lanthanum bromide.

The design of the tool 75 may locate materials with low atomic number between one or more of the detectors 86 and the front 98 of the tool 75 to facilitate low-energy gamma rays reaching the detector 86. This can improve sensitivity to the photoelectric factor Pe of the formation 94.

Under ideal conditions, the neutron output of a pulsed neutron generator 84 is roughly constant, but can vary by 50% and more during logging runs due to temperature fluctuations. Because a measured and/or accurate knowledge of the neutron output of the generator is not usually available, techniques have been developed to make various measurements independent of the generator's absolute output. For example, one mechanism for managing the variability in generator output is to use ratios of counts in multiple detectors to reduce sensitivity to absolute neutron output with respect to quantities such as the estimated porosity and density of the formation 94.

Of course, in some embodiments, where neutron output can be accurately measured on a substantially continuous basis, some formation parameters of interest can be computed from a single detector 86. Thus, the tool 75 may include a device 92 that measures the neutron output of the generator 84 as a function of time. This device 92 may comprise a radiation detector or some other measure of neutron output, such as an operational parameter of the neutron generator (e.g., generator target current).

The tool 75 may also include a device 96 to measure the standoff of the tool 75. For example, the device 96 may comprise an ultrasonic transducer, or a mechanical extension placed in contact with the borehole 90 surface. Other designs, well-known to those of ordinary skill in the art, may also be used.

In some embodiments, the measuring device 96 is placed approximately midway between the source 84 and the farthest detector 86d, but the relatively large size of the detectors 86c and 86d and desirability of placing them as close to the source 84 as possible sometimes results in placing the device 96 in other locations, as shown in FIG. 1.

In some cases, it is helpful to adjust the standoff measurements for depth when using such measurements in other calculations. The standoff measurements may also be adjusted based on the measured caliper of the borehole 90, in order to be more consistent with the standoff observed by the detectors 86 themselves. Such adjustments can help account for the inability of the tool 75 to stay in constant contact with the borehole 90 surface as the diameter of the borehole 90 varies. Caliper measurements of borehole diameter may also be made using ultrasonic, mechanical, and other devices, as are well-known to those of ordinary skill in the art.

In some embodiments, borehole standoff measurement data may be acquired using a single rotating transducer (e.g., a pulse-echo ultrasound transducer), well known to those of ordinary skill in the art. That is, while the transducer, mounted proximate to the face of the tool 75 is rotated in an azimuthal direction about the centerline of the borehole 90, ultrasonic energy is transmitted and received by the transducer. The time between launching the signal (e.g., the "IP" or initial pulse) and receiving its return, along with the speed of sound in the propagation medium, can be used to determine the standoff distance, as is well known to those of ordinary skill in the art.

If the tool 75 is perfectly centered on the centerline of a perfectly cylindrical borehole, the standoff distance plus the radius of the tool 75 gives the radius of the borehole 90 at the point the measurement is taken. If standoff data (e.g., comprising standoff distance measurements) is acquired throughout one complete revolution of the tool 75, the actual contour of the borehole 90 wall (which is likely not perfectly cylindrical) at the transducer elevation may be obtained. It should be noted that, while pulse-echo transducers are described for simplicity herein, a pitch-catch transducer pair (e.g., comprising separate transmitting and receiving transducers) can also be used for the acquisition of standoff data.

To reduce sensitivity to fluid in the borehole 90 and increase sensitivity to the formation 94, the tool 75 may be designed to be more sensitive to gamma rays 87, 88 coming from one side (e.g., the front 98 of the tool 75). Thus, in some embodiments, the tool 75 is eccentered so as to push the front 98 of the tool 75 against the formation 94 wall. The detectors 86 may be focused to some degree by placing high-density shielding 99 between and behind the individual detectors 86.

The output of the detectors 86 may be organized in at least two ways. For example, gamma rays detected within various time windows can be sorted according to the energy deposited in the detector 86, which yields an energy spectrum for each time window and detector 86. In addition, the total number of counts in small time windows can be recorded as a function of time, where the time is the difference between the start of the neutron burst and the time interval of the window. These time spectra may be selected to span an interval of a few hundred microseconds on up to the time of the next neutron burst event.

Figure 2A:
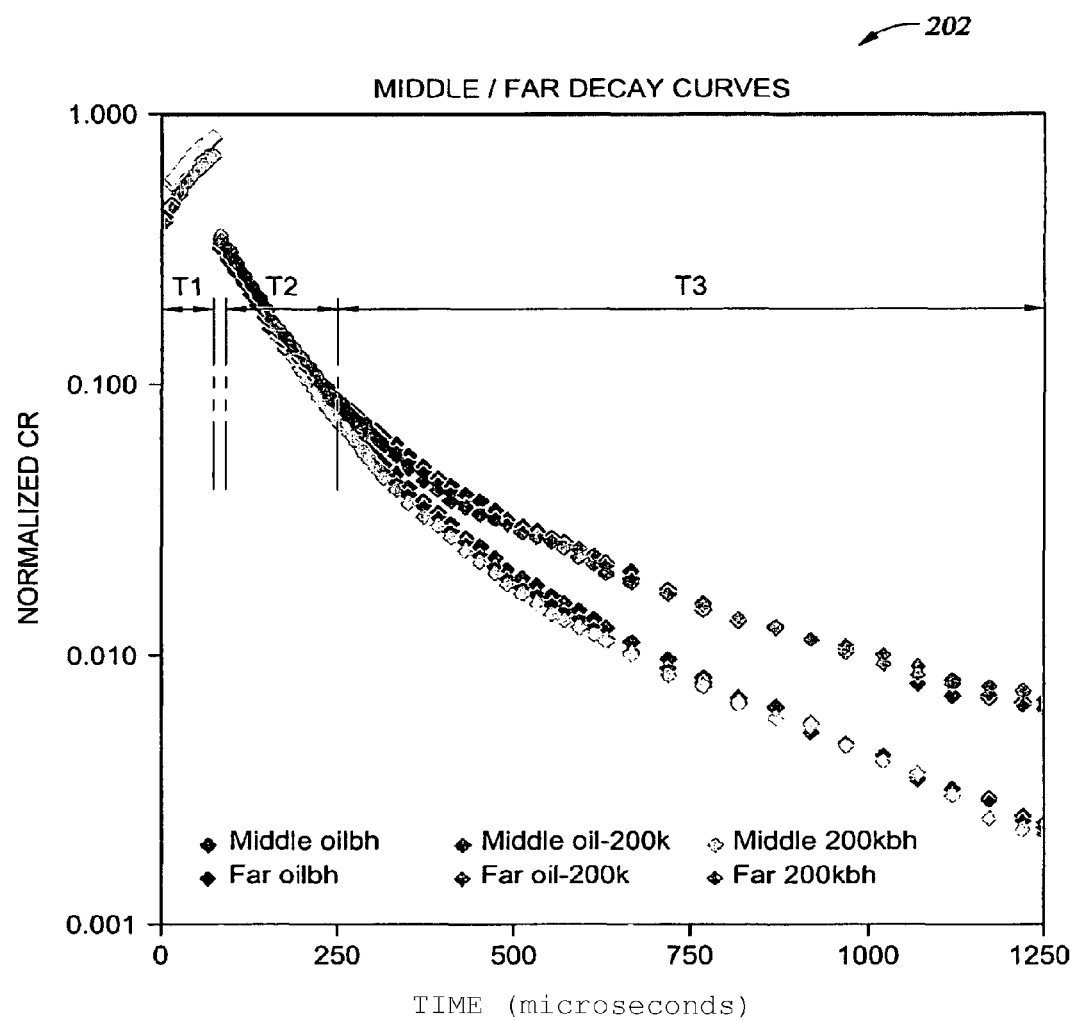
FIG. 2A is a graph illustrating neutron count rate over time according to various embodiments of the invention.

FIG. 2A. is a graph 202 illustrating neutron count rate over time according to various embodiments of the invention. Here, the time-based measurements from two detectors are shown (86c="middle" and 86d="far"). "Middle (or Far) oilbh" means a freshwater saturated formation with oil in the borehole. "Middle (or Far) oil-200 kbh" means an oil saturated formation with 200 k ppm saltwater in the borehole. "Middle (or Far) 200 kbh" means a freshwater saturated formation with 200 k ppm saltwater in the borehole.

In this case the neutron generator was turned on for 80 microseconds, and then turned off for 1250 microseconds. During the 80-microsecond time period T1 of the neutron burst, the count rate increases with time. However, once the generator is turned off during time period T2, the number of detected gamma rays decreases rapidly with time. It is therefore useful to divide each neutron burst event cycle into three different intervals: time period T1, during which the source is on, a relatively short time period T2, during which the source is off and measurements from the detectors are taken, and a relatively long time period T3, during which the source is off, and additional measurements are taken. Energy spectra can be recorded for all three intervals. Other numbers of intervals, and different divisions of intervals may also be used.

Since inelastic scattering occurs within a few microseconds of when a neutron is created in the generator, gamma rays measured during time period T1 will encompass the majority of the inelastic gamma rays that are detected. Some capture gamma rays will be included as well. To obtain relative isolation of the energy spectrum due to inelastic neutrons, a portion of the spectrum from a later period, such as time period T2, can be subtracted from that of time period T1. The spectrum obtained during time period T2 may be scaled prior to subtraction so as to remove sensitivity to capture gamma rays. The scaling factor may be determined using modeling or laboratory measurements. Since the ratio of inelastic to capture gamma rays is very much smaller during time period T2 than during time period T1, subtraction provides a resultant spectrum that can be referred to as the "inelastic spectrum." In some embodiments, the inelastic spectrum spans an energy range of about 50 keV to about 10 MeV.

Count rates are a result of both types of neutron interactions, as well as naturally radioactive isotopes in the formation. When dealing with the low count rates associated with data collected during time period T3, it is therefore useful to remove the natural-radiation component from the acquired data. This can be accomplished by periodically turning the generator off for relatively long periods of time and measuring the count rate in the latter part of this interval, where inelastic and capture gamma rays are virtually non-existent. The resulting count rates may then be taken as originating from the natural background. The background rate is then subtracted from the time spectrum when the generator is active to obtain a corrected spectrum. As is well known to those of ordinary skill in the art, the corrected spectrum can be used to compute neutron capture cross sections of the formation and the borehole.

In an effort to determine formation characteristics using adjusted gamma ray measurements, the reader is directed back to FIG. 1 and to Table I below, which lists a series of variables that affect the number of gamma rays reaching the detectors 86. Four of the variables are formation 94 properties, four are borehole 90 fluid properties, two are related to borehole 90 geometry, and one is a generator 84 variable. If measurements are made that are sensitive to the properties represented by these variables, using two or more of the detectors 86, many formation characteristics can be determined, including density, porosity, and photoelectric factor Pe. Although porosity is not one of the variables in Table I, it can be computed from the formation slowing-down length Ls.

To begin determining formation 94 characteristics then, independent measurements of independent variables should be made. Although more detectors 86 may yield more information, there is a tradeoff between information and expense. Thus, many embodiments make use of four gamma-ray detectors 86 and one standoff-measuring device 96, as shown in FIG. 1. Borehole diameter (e.g., caliper) measurements may also be used.

TABLE I

| Symbol | Variable |
|---|---|
| $\rho_b$ | Formation bulk density (g/cc) |
| Pe | Formation photoelectric factor (barns/e$^-$) |
| $L_S$ | Neutron slowing-down length of the formation (cm) |
| $\Sigma_{fm}$ | Neutron capture cross section of the formation (cu = $10^{-3}$ cm$^{-1}$) |
| $d_h$ | Borehole size (diameter in cm) |
| SO | Standoff, the distance between the front of the tool and the formation wall, where the tool front is defined as the side where the detectors are nearest the outer diameter of the tool (cm) |
| $\rho_m$ | Mud density (g/cc) |
| Pe$_m$ | Mud photoelectric factor (barns/e$^-$) |
| $L_{S,m}$ | Neutron slowing-down length of the mud (cm) |
| $\Sigma_m$ | Neutron capture cross section of the mud (cu = $10^{-3}$ cm$^{-1}$) |
| N | Number of neutrons generated per second (integer/sec) |

If it is assumed that count rates are proportional to the number of neutrons generated per second (N), the ratio of any two count rates is independent of the neutron generation rate. Therefore, dependence on the neutron generation rate N can be substantially eliminated by using such ratios. If this approach is used, the number of unknowns in Table I is now ten. If at least ten measurements that have different sensitivities to these remaining unknowns can be identified, then the values of the unknowns can be determined.

As mentioned previously, the borehole size ($d_h$) can be measured directly using one of the caliper measurement devices that are well-known to those of ordinary skill in the art. Standoff (SO) can be measured directly with the tool-incorporated standoff measurement device 96.

Since the photoelectric factor (Pe) affects mainly low-energy gamma rays, the ratio of low-energy to high-energy gamma rays measured at detectors 86a, 86c, and 86d should be primarily sensitive to formation Pe, as long as the tool 75 maintains good contact with the formation 94, or the mud weight is low. Using this traditional method of measuring formation photoelectric factor Pe means there will likely be a small sensitivity in the determination of formation photoelectric factor Pe to formation density.

Similarly, the ratio of low-energy to high-energy gamma rays measured in detector 86b will yield the photoelectric factor of the mud photoelectric factor Pem, with a small sensitivity in the determination of the mud photoelectric factor Pem to mud density $\rho_m$.

The time spectrum from the four detectors 86 can be used to determine the mud (sometimes referred to as borehole) and formation capture cross sections $\Sigma_m$, $\Sigma_{fm}$ in a manner that is well-known to those of ordinary skill in the art. The proximity of detector 86b to the borehole-side of the tool 75 means that this detector can be used to provide a better measure of the mud capture cross section $\Sigma_m$.

Consider now the transport of inelastic gamma rays to the detectors 86. As neutrons travel outward from the generator 84, some travel forward into the formation 94 and some travel backwards and sideways. Those that travel forward pass through any mud that is between the tool 75 and the formation 94 (due to standoff) before moving on into the formation 94 itself. The distance they travel before they can no longer generate gamma rays 87 through inelastic scattering depends on the slowing down length of the mud Lsm, standoff SO, and slowing down length of the formation Ls. Some of the gamma rays 87 generated from inelastic scattering will scatter into the detectors 86. In general, the inelastic gamma rays will have to travel a short distance to detectors 86a and 86b, a farther distance to detector 86c, and a still farther distance to detector 86d. These distances are affected by the slowing down lengths involved. The number of gamma rays that reach the detectors drops exponentially with the product of distance traveled in the formation 94 and formation density $\rho_b$. In traveling through standoff-related mud between the formation 94 and tool 75, the gamma rays will be further attenuated at a rate in accordance with the exponential of the product of the mud density $\rho_m$ and distance traveled in the mud.

If the neutrons that traveled forward into the formation 94 were the only ones involved, then the ratio between detectors 86a and 86c or 86d would remove much of the sensitivity to slowing down length Ls. However, there are also neutrons that travel backwards and sideways from the generator 84. The distance they travel in the mud depends on the borehole diameter $d_h$. These neutrons will generally slow down faster because they travel through more mud, which typically has a greater concentration of hydrogen than the formation 94. Transport of the inelastic gamma rays generated from these neutrons will therefore be strongly influenced by the mud density $\rho_m$, the mud photoelectric factor Pem, as well as the borehole diameter $d_h$. They will tend to enter the detectors 86 from the back and sides of the detectors 86, but shielding around the detectors 86 can attenuate their numbers. Thus, the inelastic ratios will have a strong dependence on formation density $\rho_b$, and a weaker dependence on slowing down lengths of the formation and mud Ls, Lsm, standoff SO, borehole diameter $d_h$, mud density $\rho_m$, and mud photoelectric factor Pem.

The reader is now invited to consider the ratios of inelastic count rates in detector 86a to the count rates measured in 86c and 86d detectors. These count rates may be obtained from summing the decay curve (counts as a function of time) over the inelastic time interval (T1).

As gamma rays 87, 88 travel through the formation 94 and any standoff gap en route to the detectors 86, the ratio of the path length in the gap to that in the formation 94 will be different for gamma rays that travel to detector 86c than for those that travel to detector 86d. Consequently, the inelastic ratios of the two sets of gamma rays will have different dependences on the mud density $\rho_m$ and mud photoelectric factor Pem. Since standoff is determined independently (e.g., via the device 96), and the Pe ratio of detector 86b is strongly dependent on the mud photoelectric factor Pem, these differences can be used to determine the mud density $\rho_m$.

Figure 2B:
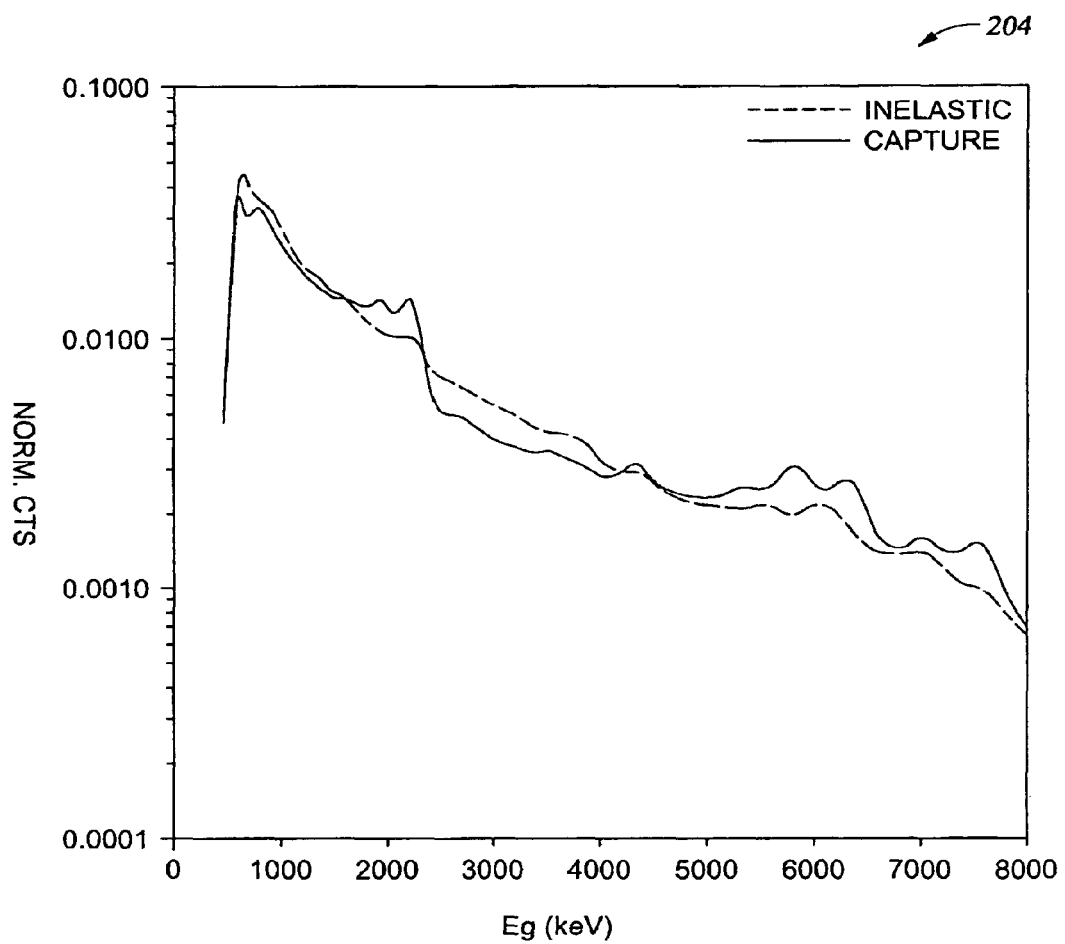
FIG. 2B is a graph illustrating energy spectra according to various embodiments of the invention.

FIG. 2B is a graph 204 illustrating energy spectra according to various embodiments of the invention. The vertical axis is normalized counts per second (CTS) and the horizontal axis is gamma energy (in keV). The two curves are the inelastic spectrum from interval T1 and the capture spectrum from interval T3 for a limestone formation. It may therefore be advantageous to divide the spectra into two different energy ranges, and obtain two ratios for each detector, since these ratios will have different sensitivities to the mud density $\rho_m$ and mud photoelectric factor Pe.

Consider now the ratios of count rates for the nearest, formation side detector 86a to the count rates measured at the middle and far detectors 86c, 86d for the capture window of time period T3 in FIG. 2A. These count rates are determined by adding up the counts in the decay curve over this time period. The region from which neutrons can be captured is controlled by the slowing-down length and thermal diffusion length of the neutrons in the formation and borehole, generally encompassing detector 86a.

The thermal diffusion length for individual gamma rays depends on the capture cross section of the mud in the borehole 90 and the formation 94. Thus, a large number of gamma rays 87 can reach detector 86a without passing through much of the formation. The greater the diffusion length, the larger the region from which neutrons can be captured becomes and the closer this region comes to detector 86c. This results in more gamma rays reaching detector 86c, which causes the capture ratio between detector 86a and detector 86c to decrease as the diffusion length increases.

Since the diffusion length decreases with porosity, this means that the capture ratio between detector 86a and detector 86c will increase with porosity. As the porosity increases and diffusion length decreases, the amount of the formation 94 that gamma rays 88 traverse to reach detector 86c increases. Density attenuation decreases with porosity, which tends to decrease the capture ratio. That is, the slope of the capture ratio decreases at higher porosities.

In summary, the capture ratio is strongly dependent on the slowing down length Ls and capture cross section $\Sigma_{fm}$ of the formation 94. However, there is still some sensitivity to standoff distance SO, formation density $\rho_b$, slowing down-length of the mud $L_{S,m}$, capture cross section of the mud $\Sigma_m$, borehole diameter $d_h$, density of the mud $\rho_m$, and the mud photoelectric factor Pem. It may be inferred that the capture ratio of detector 86d will have greater density sensitivity than that of detector 86c because the capture gamma rays pass through more of the formation 94 to reach detector 86d than is traversed to reach detector 86c.

None of the measurements described above has a particularly strong or unique dependence on the slowing down length of the mud $L_{S,m}$. However, the value of this variable can be computed from the mud weight and the type of mud being used, which are generally known. The mud density $\rho_m$ and photoelectric factor Pe values, once determined, may also be used to improve the value determined for the slowing down length of the mud $L_{S,m}$ in an iterative fashion.

At this point, enough independent information exists to compute the unknowns listed in Table I, except for the generator strength, or number of neutrons generated per second N. However, if the computations are made to be substantially independent of this value, the formation density $\rho_b$ and formation photoelectric factor Pe can then be calculated.

The porosity can be obtained from the slowing down length of the formation Ls if the lithology, formation salinity, temperature, and pressure are known. These parameters are standard entries in neutron-porosity logs, and can be specified by the operator in the usual fashion. Solving for the unknowns will be discussed in greater detail below.

Figure 3:
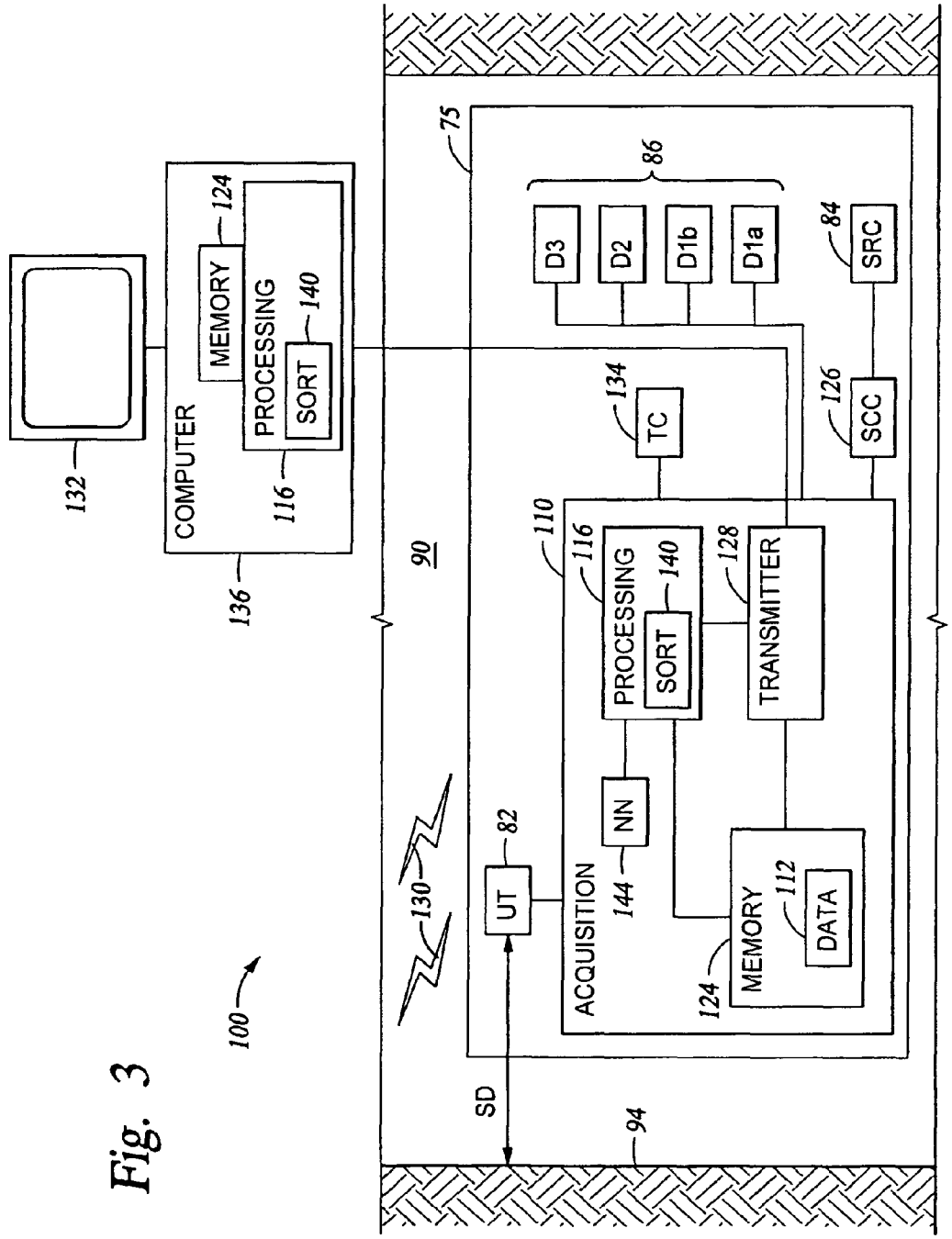
FIG. 3 is a block diagram of an apparatus according to various embodiments of the invention.

To implement the mechanisms described for determining formation characteristics, a variety of apparatus, systems, and methods may thus be used. For example, FIG. 3 is a block diagram of an apparatus 100 according to various embodiments of the invention. The apparatus 100 (which may include any one or all of the components of the tool 75 shown in FIG. 1) may therefore comprise an acceleration-excited source 84 to switchably irradiate a portion of a geological formation 94 with neutrons in a neutron burst. The apparatus 100 can also include acquisition logic circuitry 110 and one or more detectors 86 to measure (e.g., as a function of time) a flux of gamma rays, wherein at least a portion of the gamma rays are generated by the neutrons provided by the source 84. The measured flux may be stored as data 112 in a memory 124.

The apparatus 100 may further include processing logic circuitry 116 to determine one or more of the neutron porosity, the density $\rho_b$, and/or the photoelectric factor Pe of the formation 94 based on the measured flux. The processing logic circuitry 116 may be included in a downhole tool 75, or above-ground (e.g., as part of an above-ground computer workstation, such as computer 136, perhaps located in a logging facility), or both. Results of the data acquisition activity (i.e., data 112) or data processing by the processing logic circuitry 116 may be displayed on a display 132 coupled to the computer 136. That is, the results of any calculation or determination described herein can be displayed on the display 132.

In some embodiments, the apparatus 100 includes one or more sensors (e.g., ultrasound sensors) in a device 82 that can receive signals 130 (e.g., pulse-echo ultrasound signals), perhaps used to determine the standoff distance SO. That is, one or more transducers may be coupled to the acquisition logic circuitry 110 to provide borehole standoff data measurements (e.g., measurements from which the distance SO can be derived) associated with the borehole 90 in the geological formation 94.

The apparatus 100 may include source control circuitry 126 to couple to the acquisition logic circuitry 110 and to switchably enable the acceleration-excited source 84.

Additional components may form a part of the apparatus 100. For example, the apparatus 100 may include timing circuitry 134 to couple to the acquisition logic circuitry and to define a plurality of time periods related to the function of time over which the flux is measured by the detectors 86. The apparatus 100 may also include logic circuitry 140 to sort a plurality of measured gamma ray fluxes into a plurality of energy bins assigned to time windows.

In some embodiments, the apparatus 100 includes a neural network 144 to receive neutron capture cross-section data as input data, and to generate the neutron porosity or the density as output data. This can occur, for example, when the neural network has been trained to process such data in a laboratory, or the field, and the trained network is then utilized to process the same type of data in conjunction with data acquisition activity conducted by the apparatus 100. Alternatively, this may be implemented in the surface computer 136.

The apparatus 100 may also include one or more logging memories 124. If the neutron porosity, the density $\rho_b$, and/or the photoelectric factor Pe of the formation 94 are determined below the surface, this data may be stored in a logging memory 124 as data 112 below the surface, or communicated to and stored in a logging memory 124 above the surface, via transmitter 128.

Figure 4A:
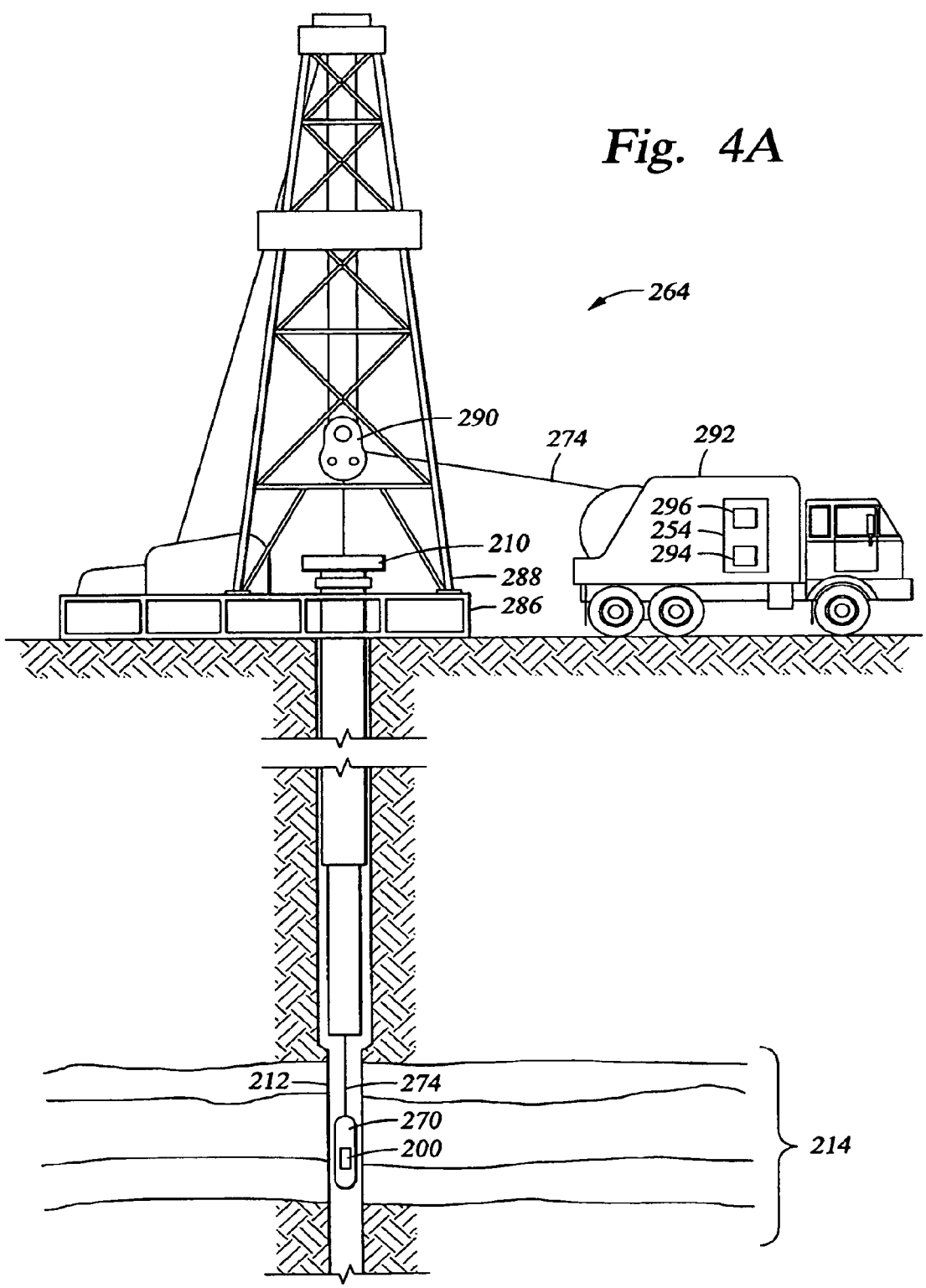
FIGS. 4A and 4B are block diagrams of apparatus and systems according to various embodiments of the invention.
Figure 4B:
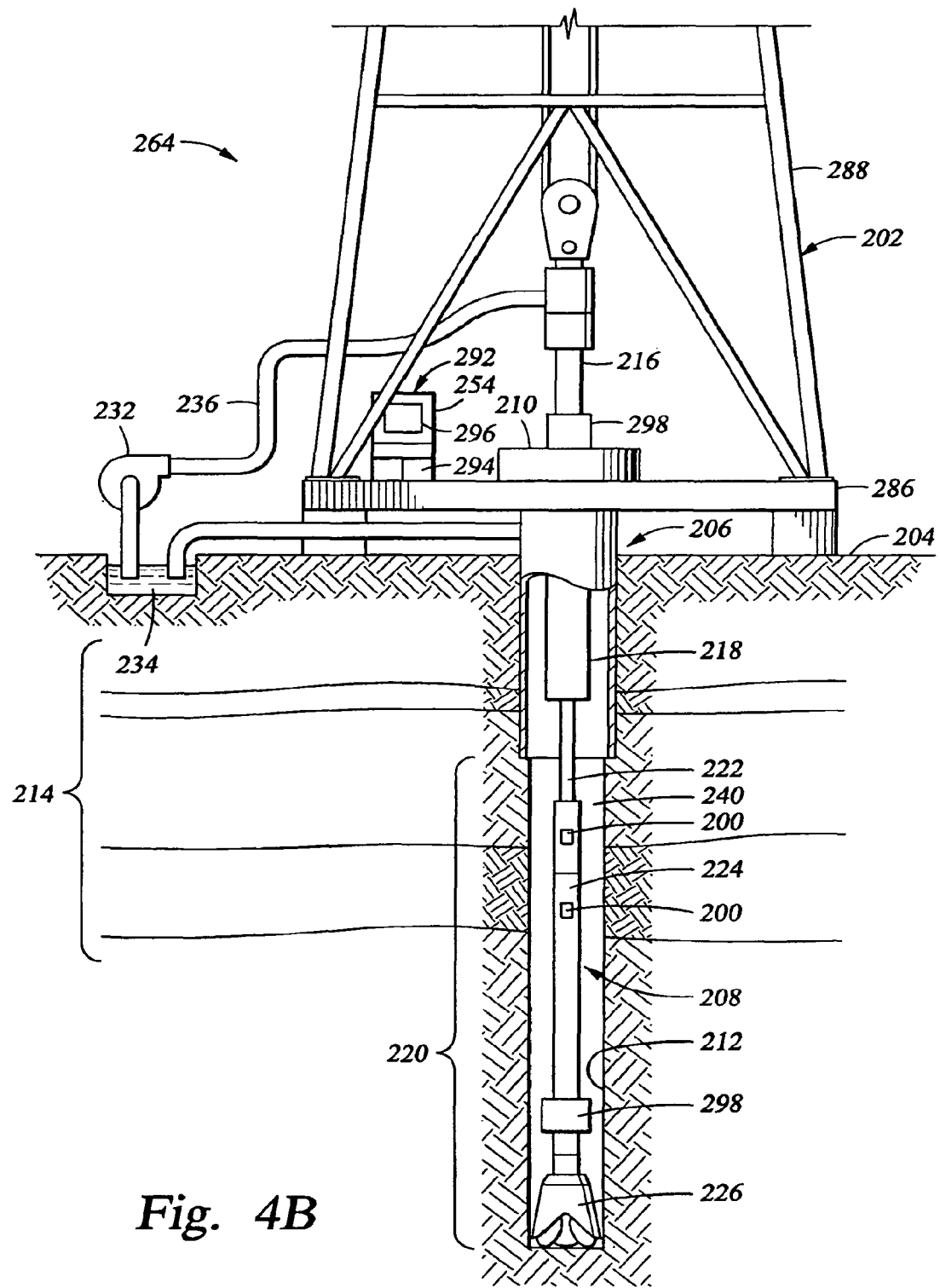

FIGS. 4A and 4B are block diagrams of apparatus 200 and systems 264 according to various embodiments of the invention. The apparatus 200, which may be similar to or identical to the apparatus 100 described above and shown in FIG. 3, may comprise portions of a tool body 270 as part of a wireline logging operation, or of a downhole tool 224 (similar to or identical to the tool 75 of FIG. 1) as part of a downhole drilling operation. A system 264 may comprise more than one of the apparatus 200.

FIG. 4A shows a well during wireline logging operations. A drilling platform 286 may be equipped with a derrick 288 that supports a hoist 290. Oil and gas well drilling operations are commonly carried out using a string of drill pipes connected together so as to form a drilling string that is lowered through a rotary table 210 into a wellbore or borehole 212.

Here it is assumed that the drilling string has been temporarily removed from the borehole 212 to allow a tool body 270 (e.g., a wireline logging tool), such as a probe or sonde, to be lowered by wireline or logging cable 274 into the borehole 212. Typically, the tool body 270 is lowered to the bottom of the region of interest and subsequently pulled upward at a substantially constant speed. During the upward trip, instruments included in the tool body 270 (e.g., apparatus 200) may be used to perform measurements on the subsurface formations 214 adjacent the borehole 212 as they pass by, or as the tool body 270 remains stationary.

Measurement data (e.g., similar or identical to data 112 of FIG. 3) may include standoff distance data and flux measurements that can be communicated to a logging facility 292 for storage, processing, and analysis. The logging facility 292 may be provided with electronic equipment for various types of signal processing. Similar log data may be gathered and analyzed during drilling operations (e.g., during logging while drilling (LWD) operations). For example, the tool body 270 in this case may house one or more apparatus 200, and the logging facility 292 may include one or more surface computers 254, similar to or identical to the computer 136 described above with respect to FIG. 3.

Turning now to FIG. 4B, it can be seen how a system 264 may also form a portion of a drilling rig 202 located at a surface 204 of a well 206. The drilling rig 202 may provide support for a drill string 208. The drill string 208 may operate to penetrate a rotary table 210 for drilling a borehole 212 through subsurface formations 214. The drill string 208 may include a Kelly 216, drill pipe 218, and a bottomhole assembly 220, perhaps located at the lower portion of the drill pipe 218. The drill string 208 may include wired and unwired drill pipe, as well as wired and unwired coiled tubing, including segmented drilling pipe, casing, and coiled tubing.

The bottomhole assembly 220 may include drill collars 222, a downhole tool 224, and a drill bit 226. The drill bit 226 may operate to create a borehole 212 by penetrating the surface 204 and subsurface formations 214. The downhole tool 224 may comprise any of a number of different types of tools including measurement while drilling (MWD) tools, LWD tools, and others.

During drilling operations, the drill string 208 (perhaps including the Kelly 216, the drill pipe 218, and the bottomhole assembly 220) may be rotated by the rotary table 210. In addition to, or alternatively, the bottomhole assembly 220 may also be rotated by a top drive or a motor (e.g., a mud motor) that is located downhole. The drill collars 222 may be used to add weight to the drill bit 226. The drill collars 222 also may stiffen the bottomhole assembly 220 to allow the bottomhole assembly 220 to transfer the added weight to the drill bit 226, and in turn, assist the drill bit 226 in penetrating the surface 204 and subsurface formations 214.

During drilling operations, a mud pump 232 may pump drilling fluid (sometimes known by those of ordinary skill in the art as "drilling mud" or simply "mud") from a mud pit 234 through a hose 236 into the drill pipe 218 and down to the drill bit 226. The drilling fluid can flow out from the drill bit 226 and be returned to the surface 204 through an annular area 240 between the drill pipe 218 and the sides of the borehole 212. The drilling fluid may then be returned to the mud pit 234, where such fluid is filtered. In some embodiments, the drilling fluid can be used to cool the drill bit 226, as well as to provide lubrication for the drill bit 226 during drilling operations. Additionally, the drilling fluid may be used to remove subsurface formation 214 cuttings created by operating the drill bit 226.

Thus, referring now to FIGS. 1-3 and 4A-4B, it may be seen that in some embodiments, the system 264 may include a drill collar 222, and/or a downhole tool 224, or a tool body 270 or a substantially permanently installed probe (in a downhole well), to which one or more apparatus 200 are attached. The downhole tool 224 may comprise an LWD tool or MWD tool. The tool body 270 may comprise a wireline logging tool, including a probe or sonde, for example, coupled to a cable 274, such as a wireline or logging cable. Thus, a wireline 274 or a drill string 208 may be mechanically coupled to the downhole tool 224. The downhole tool 224 may be used to at least partially house an acceleration-excited source to switchably irradiate a portion of the geological formation 214 with neutrons in a neutron burst. The system 264 may also include acquisition logic circuitry, one or more detectors to measure gamma ray flux, and processing logic circuitry, each of which operates as described previously.

In some embodiments, then, a system 264 may include one or more transducers to couple to the acquisition logic circuitry and to provide borehole standoff data associated with the downhole tool and a borehole in the geological formation. Some systems 264 may include a logging memory 294 and a transmitter to send formation neutron porosity, density, and photoelectric factor information to the logging memory 294, which may be included in a logging station 292. One or more displays 296 may be included in the system 264 as part of a surface computer 254 to display any type of acquired data and/or calculated formation/mud characteristic, including neutron porosity, density, and photoelectric factor. In some embodiments, the acquisition logic circuitry and the processing logic circuitry are each included in the downhole tool 224.

The logging tools 75, 224; detector package 80; source 84; detectors 86; device 92; device 96; apparatus 100, 200; acquisition logic circuitry 110; data 112; processing logic circuitry 116; memories 124, 294; control circuitry 126; transmitter 128; displays 132, 296; timing circuitry 134; computers 136, 254; logic circuitry 140; neural network 144; drilling rig 202; drill string 208; rotary table 210; Kelly 216, drill pipe 218; bottomhole assembly 220; drill collars 222; drill bit 226; mud pump 232; systems 264; tool body 270; logging cable 274; drilling platform 286; derrick 288; hoist 290; and logging facility 292 may all be characterized as "modules" herein. Such modules may include hardware circuitry, and/or a processor and/or memory circuits, software program modules and objects, and/or firmware, and combinations thereof, as desired by the architect of the apparatus 100, 200 and systems 264, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for borehole drilling and logging operations, and thus, various embodiments are not to be so limited. The illustrations of apparatus 100, 200 and systems 264 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as process measurement instruments, personal computers, workstations, medical devices, and vehicles, among others. Some embodiments include a number of methods.

Figure 5:
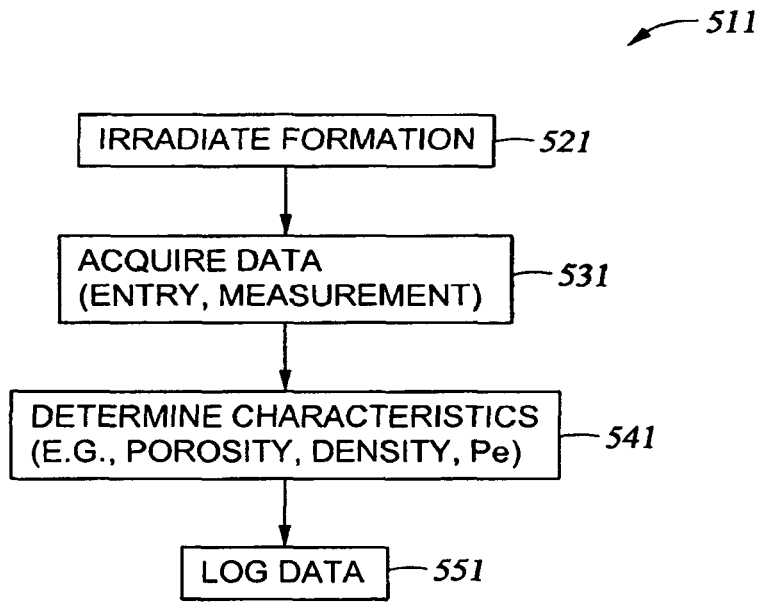
FIG. 5 is a method flow diagram according to various embodiments of the invention.

FIG. 5 is a method flow diagram 511 according to various embodiments of the invention. There are several ways that the measured data and other information (e.g., log parameters obtained from a drilling site) can be combined to determine the desired unknowns. A first technique involves writing a function relating the desired variables to the measured values using free parameters, and then to determine the best values for these parameters using a regression analysis based on a substantial amount of laboratory or modeling measurements. This method may provide a relatively quick and easy way to obtain an approximate solution.

A second technique is to determine the functional relationship between each measurement and the many variables. This is done by acquiring a large number of data points, either through experimentation or calculation. While logging or drilling, a set of measurements can be acquired at each depth. For each set of measurements, this provides a set of equations more numerous than the number of unknowns. The best set of unknowns can then be determined. For example, each unknown may be estimated using the first technique described above. Of course, this approach would not normally be used for unknowns that are measured directly, or computed from external inputs. The equations can then be rendered as a Taylor series expansion that is linear in the set of unknowns. Techniques known to those of ordinary skill in the art can thereafter be employed to obtain improved solutions using a least-squares analysis. If desired, this technique can be iterated about the solutions obtained to provide a more accurate answer.

A third technique involves the use of a neural network (as mentioned previously) to compute the unknowns. Neural networks, which are well known to those of ordinary skill in the art, provide a mechanism for receiving many measurements as input, with solutions to complicated problems as output, without understanding the details of the solution. As with the previous techniques, using a large set of data to train/calibrate the system is useful.

In still further embodiments, additional detectors can be used to provide refined sensitivity measurements. A monitor of the neutron output from the source could also be used. This would obviate working with inelastic and capture ratios, such that count rates from individual detectors could be used directly. For example, this implementation might permit detector 86a to be removed from the apparatus shown in FIG. 1.

Thus, many embodiments may be realized. For example, a method 511 may begin at block 521 with irradiating a portion of a geological formation with neutrons in a neutron burst generated by a switchable electronic source. Such a source is capable of producing neutrons under electronic control. That is, neutron generation can be started and stopped electronically.

The method 511 may continue with acquiring data at block 531. Acquisition may be accomplished by direct entry (e.g., transferring known log parameters, such as mud weight and the type of mud being used), or by measurement. Thus, the method 511 may include measuring, as a function of time, using one or more detectors, a flux of gamma rays, wherein at least a portion of the gamma rays are generated by the neutrons at block 531. This particular measurement is known to those of ordinary skill in the art as obtaining the "decay time spectrum." Capture cross sections can be determined from these measurements.

The method 511 may go on to include determining one or more of the neutron porosity, the density, and/or the photoelectric factor of the geological formation based on the measured flux at block 541. Finally, the method 511 may include logging any of the acquired data and/or the determined formation characteristics (e.g., neutron porosity, density, and/or photoelectric factor), perhaps in a memory, at block 551.

The measuring activities at block 531 may comprise measuring the flux of gamma rays in a time interval coincident with some portion of the neutron burst (e.g., see time period T1 of FIG. 2). Measuring may also comprise measuring a gross count rate of the gamma rays, which includes all gamma rays detected with an energy above a minimum threshold. These gamma rays may be generated primarily from inelastic scattering of the neutrons. The gross count rate can be measured, or an energy spectrum can be measured, and then count rates can be determined for various energy ranges.

In addition, the measuring activities at block 531 may comprise measuring an energy spectrum to determine count rates of the gamma rays for a plurality of energy ranges, as well as measuring the flux of gamma rays in a time interval after the source is turned off (the reader is referred to time period T3 of FIG. 2). These gamma rays may be generated primarily from neutron capture. Again, a gross count rate can be measured, or an energy spectrum can be measured and used to determine count rates for various energy ranges.

Measuring activities at block 531 may also include measuring the flux of the gamma rays to determine a background gamma ray flux measurement in a time window substantially free of the portion of the gamma rays being generated by the neutrons. In some cases, the majority of this measured flux comprises capture gamma rays.

Other measurement activities conducted at block 531 include measuring a standoff distance in a borehole in the geological formation using at least one of an acoustic signal or a mechanical device. The borehole diameter in the geological formation may be measured with a caliper device.

The determination activities of block 541 may likewise include many elements. For example, such activities may include determining decay constants of the formation and of the borehole based on the measured flux. In particular, the photoelectric factor may be determined from an energy spectrum associated with the flux over the time interval of measurement. The photoelectric factor may also be determined from an energy spectrum associated with the measured flux and the gross count rate over the time interval. In some embodiments, the photoelectric factor is determined using the background flux.

Determination of the neutron porosity, density, and/or photoelectric factor of the geological formation at block 541 may include determining the rate at which neutrons are generated. The ratios of the flux measured by different detectors may be used to reduce dependence on the rate of neutron irradiation, using pairs of detectors, as mentioned previously.

According to the different solution techniques, other events may occur within the determination activities of block 541. For example, using the first technique, the neutron porosity, the density, and/or the photoelectric factor may be computed from a function of a plurality of measured fluxes, including the measured flux. This is more general than computations using ratios, since a function of ratios can also be written as a function in fluxes. This technique may further include determining decay constants of the geological formation and the borehole in the geological formation, as well as determining one or more of the neutron porosity, the density, and the photoelectric factor from a function of ratios associated with the measured flux and the decay constants. The coefficient terms of the function can be determined by regression, perhaps based on laboratory measurement and mathematical modeling of the tool response.

Using the second technique, the activities at block 541 may include determining functional relationships between the measured flux and decay constants, and variables associated with the geological formation and the borehole. Such variables include those listed in Table I: the bulk density of the geological formation, the photoelectric factor of the geological formation, the neutron slowing-down length of the geological formation, the neutron capture cross section of the geologic formation, the diameter of the borehole in the geological formation, the standoff distance from the borehole, the mud density in the borehole, the photoelectric factor of the mud, the neutron slowing-down length of the mud, and the neutron capture cross section of the mud. The method 511 may go on to determine the variables that provide substantial agreement between the measured flux and the decay constants, and the functional relationships at block 541, as well as determining one or more of the neutron porosity, density, and/or photoelectric factor of the formation from the variables. As noted previously, this activity involves solving multiple equations simultaneously, and the functional relationships can be determined by lab measurements and calculation.

Using the third technique, the activities at block 541 may include providing the measured flux and decay constants as input data to a neural network. The method 511 may then go on to include generating one or more of the neutron porosity, the density, and the photoelectric factor as an output of the neural network.

It should be noted that the methods described herein do not have to be executed in the order described. Moreover, various activities described with respect to the methods identified herein can be executed in iterative, serial, or parallel fashion. Information, including parameters, commands, operands, and other data, can be sent and received, and perhaps stored using a variety of media, tangible and intangible, including one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand that various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly, FORTRAN or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 6:
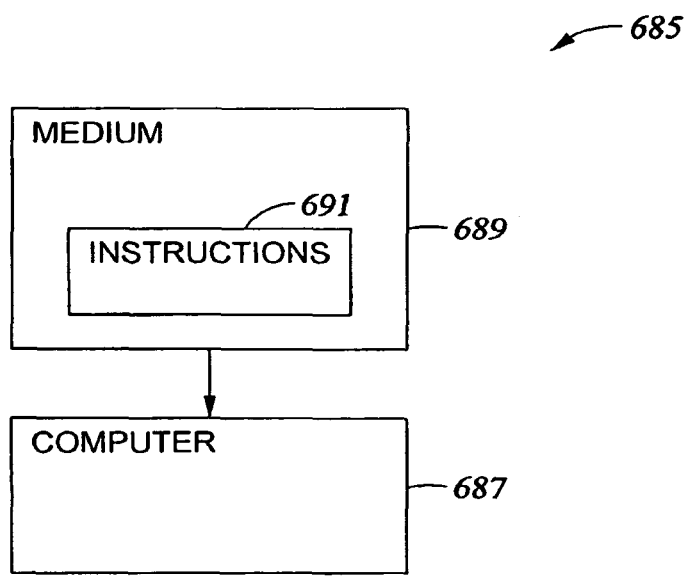
FIG. 6 is a block diagram of an article according to various embodiments of the invention.

FIG. 6 is a block diagram of an article 685 according to various embodiments of the invention. The article 685 comprises an article of manufacture, such as a computer, a memory system, a magnetic or optical disk, some other storage device, and/or any type of electronic device or system. For example, the article 685 may include a processor 687 coupled to a computer-readable medium such as a memory 689 (e.g., fixed and removable storage media, including tangible memory having electrical, optical, or electromagnetic conductors) having associated information 691 (e.g., computer program instructions and/or data), which when executed by a computer, causes the computer (e.g., the processor 487) to perform a method including such actions as irradiating a portion of a geological formation with neutrons in a neutron burst generated by a switchable electronic source, measuring with one or more detectors a flux of gamma rays, at least a portion of the gamma rays being generated by the neutrons as a function of time, and determining at least one of a neutron porosity, a density, and a photoelectric factor of the geological formation based on the measured flux. In fact, any of the activities described with respect to the various methods above may be implemented in this manner.

Thus, it should be noted that various embodiments of the invention described herein each provide a useful, concrete, and tangible result. The embodiments disclosed are useful because, for example, the porosity, density, and photoelectric factor of a geological formation can directly indicate how easy or difficult petroleum recovery operations may be. This indication is specific, substantial, and credible. Formation porosity, density, and photoelectric factor are tangible, because they convey real-world, as opposed to abstract, information regarding the structure of the formation surrounding the borehole at the point where gamma ray flux measurements are made. Formation porosity and density are also concrete, since their determination is substantially repeatable.

Implementing the apparatus, systems, and methods of various embodiments may provide the ability to determine formation characteristics with greater accuracy than was previously achieved with a switchable electronic source. Thus, formation characteristics, and the effect on petroleum recovery operations, may be arrived at with greater confidence in a variety of situations. Finally, a non-chemical source of neutrons, combined with the determination of inelastic and capture ratios using multiple gamma-ray detectors can be used to determine formation density, neutron porosity, and photoelectric factor without calibrating the system using an existing log.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   irradiating a portion of a geological formation with neutrons in a neutron burst generated by a switchable electronic source;
   measuring, with one or more detectors, flux of gamma rays recorded over time with respect to the neutron burst, at least a portion of the gamma rays being generated by the neutrons;
   obtaining a decay time spectrum from the flux measured as a function of time by recording gamma counts using small time windows, spanning an interval from the neutron burst to the next neutron burst event, sufficient to generate a functional relationship of the flux with respect to time;
   determining at least one of a formation capture cross section or a borehole capture cross section from the decay time spectrum; and
   determining at least one of a neutron porosity, a density, or a photoelectric factor of the geological formation based on the at least one of the formation capture cross section or the borehole capture cross section and using one or more functional relationships from a plurality of data.

2. The method of claim 1, wherein the measuring comprises:
   measuring the flux of gamma rays in a time interval coincident with some portion of the neutron burst.

3. The method of claim 2, wherein the measuring comprises:
   measuring a gross count rate of the gamma rays.

4. The method of claim 3, wherein the photoelectric factor is determined from an energy spectrum associated with the measured flux over the time interval.

5. The method of claim 2, wherein the measuring comprises:
   measuring an energy spectrum to determine count rates of the gamma rays for a plurality of energy ranges.

6. The method of claim 1, wherein the measuring comprises:
   measuring the flux of gamma rays in a time interval after the source is turned off.

7. The method of claim 6, wherein a majority of the measured flux comprises capture gamma rays.

8. The method of claim 6, wherein the photoelectric factor is determined from an energy spectrum associated with the flux over the time interval.

9. The method of claim 1, wherein the measuring comprises:
   measuring the flux of the gamma rays to determine a background gamma ray flux measurement in a time window substantially free of a portion of the gamma rays being generated by the neutrons.

10. The method of claim 1, wherein the determining comprises:
    determining decay constants of the formation and of the borehole based on the measured flux.

11. The method of claim 1, comprising:
measuring a standoff distance in a borehole in the geological formation using at least one of an acoustic signal or a mechanical device.

12. The method of claim 1, comprising:
measuring a borehole diameter in the geological formation with a caliper device.

13. The method of claim 1, wherein determining the at least one of the neutron porosity, the density, or the photoelectric factor comprises:
determining a rate at which the neutrons are generated.

14. The method of claim 1, wherein ratios of the flux measured by different detectors included in the one or more detectors are used to reduce dependence on the rate of neutron irradiation, wherein the one or more detectors comprise two or more detectors.

15. The method of claim 1, wherein the at least one of the neutron porosity, the density, or the photoelectric factor is computed based on the decay time spectrum from a function of a plurality of measured fluxes, including the measured flux.

16. The method of claim 15, comprising:
determining decay constants of the geological formation and of a borehole in the geological formation; and
determining at least one of the neutron porosity, the density, or the photoelectric factor from a function of ratios associated with the measured flux and the decay constants.

17. The method of claim 15 wherein coefficient terms of the function are determined by regression.

18. The method of claim 1, comprising:
determining functional relationships between the measured flux and decay constants, and variables associated with the geological formation and with the borehole, the variables including a bulk density of the geological formation, a photoelectric factor of the geological formation, a neutron slowing-down length of the geological formation, the neutron capture cross section of the geologic formation, a diameter of a borehole in the geological formation, a standoff distance from the borehole, mud density in the borehole, a photoelectric factor of the mud, a neutron slowing-down length of the mud, and a neutron capture cross section of the mud;
determining the variables that provide substantial agreement between the measured flux and the decay constants, and the functional relationships; and
determining the at least one of the neutron porosity, the density, or the photoelectric factor from the variables.

19. The method of claim 1, comprising:
providing the measured flux and decay constants as input data to a neural network; and
generating the at least one of the neutron porosity, the density, or the photoelectric factor as an output of the neural network.

20. The method of claim 1, comprising:
logging the at least one of the neutron porosity, the density, or the photoelectric factor.

21. The method of claim 1, wherein using the decay time spectrum includes using the decay time spectrum to obtain a capture cross section.

22. The method of claim 1, wherein measuring flux of gamma rays recorded over time with respect to the neutron burst includes:
determining count rates of detected gamma rays during a first time period of the neutron burst;
determining count rates of detected gamma rays during a second time period in which the switchable electronic source is off immediately following the first time period of the neutron burst; and
determining count rates of detected gamma rays during a third time period in which the switchable electronic source is off, the third time period being a long time period relative to the second time period, the switchable electronic source being off from beginning of the second time period to end of the third time period.

23. An apparatus, comprising:
an acceleration-excited source arranged to switchably irradiate a portion of a geological formation with neutrons in a neutron burst;
acquisition logic circuitry and one or more detectors arranged to measure and record flux of gamma rays over time with respect to the neutron burst, at least a portion of the gamma rays being generated by the neutrons, and arranged to obtain a decay time spectrum from the flux measured as a function of time by recordation of gamma counts with use of small time windows, spanning an interval from the neutron burst to the next neutron burst event, sufficient to generate a functional relationship of the flux with respect to time; and
processing logic circuitry arranged to determine at least one of a formation capture cross section or a borehole capture cross section from the decay time spectrum and to determine at least one of a neutron porosity, a density, or a photoelectric factor of the geological formation based on the at least one of the formation capture cross section or the borehole capture cross section and on one or more functional relationships from a plurality of data.

24. The apparatus of claim 23, comprising:
source control circuitry to couple to the acquisition logic circuitry and to switchably enable the acceleration-excited source.

25. The apparatus of claim 23, comprising:
timing circuitry to couple to the acquisition logic circuitry and to define a plurality of time periods related to the function of time.

26. The apparatus of claim 23, comprising:
logic circuitry to sort a plurality of measured gamma ray fluxes including the measured flux into a plurality of energy bins assigned to time windows.

27. The apparatus of claim 23, comprising:
a neural network to receive neutron capture cross-section data as input data, and to generate the neutron porosity or the density as output data.

28. A system, comprising:
a downhole tool arranged to at least partially house an acceleration-excited source arranged to switchably irradiate a portion of a geological formation with neutrons in a neutron burst;
acquisition logic circuitry and one or more detectors arranged to measure and record flux of gamma rays over time with respect to the neutron burst, at least a portion of the gamma rays being generated by the neutrons, and arranged to obtain a decay time spectrum from the flux measured as a function of time by recordation of gamma counts with use of small time windows, spanning an interval from the neutron burst to the next neutron burst event, sufficient to generate a functional relationship of the flux with respect to time; and
processing logic circuitry arranged to determine at least one of a formation capture cross section or a borehole capture cross section from the decay time spectrum and to determine at least one of a neutron porosity, a density, or a photoelectric factor of the geological formation based on the at least one of the formation capture cross section or the borehole capture cross section and on one or more functional relationships from a plurality of data.

29. The system of claim 28, comprising:
a transducer to couple to the acquisition logic circuitry and to provide borehole standoff data associated with the downhole tool and a borehole in the geological formation.

30. The system of claim 28, comprising:
a logging memory; and
a transmitter to send the at least one of the neutron porosity, the density, or the photoelectric factor to the logging memory.

31. The system of claim 28, comprising:
a display to display the at least one of the neutron porosity, the density, or the photoelectric factor.

32. The system of claim 28, wherein the acquisition logic circuitry and the processing logic circuitry are each included in the downhole tool.

33. A tangible computer-readable memory having instructions stored thereon which, when executed by a computer, cause the computer to perform a method comprising:

irradiating a portion of a geological formation with neutrons in a neutron burst generated by a switchable electronic source;

measuring, with one or more detectors, flux of gamma rays recorded over time with respect to the neutron burst, at least a portion of the gamma rays being generated by the neutrons;

obtaining a decay time spectrum from the flux measured as a function of time by recording gamma counts using small time windows, spanning an interval from the neutron burst to the next neutron burst event, sufficient to generate a functional relationship of the flux with respect to time;

determining at least one of a formation capture cross section or a borehole capture cross section from the decay time spectrum; and determining at least one of a neutron porosity, a density, or a photoelectric factor of the geological formation based on the at least one of the formation capture cross section or the borehole capture cross section and using one or more functional relationships from a plurality of data.

* * * * *